Dec. 1, 1959   A. V. ALEXEFF ET AL   2,915,102
PNEUMATIC TIRE
Filed July 11, 1955

INVENTORS
ALEXANDER V. ALEXEFF,
HOWARD R. RICHARDS.
BY Ely, Pearne & Gordon
ATTORNEYS

United States Patent Office 2,915,102
Patented Dec. 1, 1959

2,915,102

PNEUMATIC TIRE

Alexander V. Alexeff, Cleveland, and Howard R. Richards, Lakewood, Ohio, assignors to Industrial Ovens, Incorporated, Cleveland, Ohio, a corporation of Ohio Application July 11, 1955, Serial No. 521,032

4 Claims. (Cl. 152—356)

This invention relates to a novel pneumatic tire structure and particularly to a tube-tire.

An object of the invention is to provide a tire that, for a given weight and cost, is stronger and more durable and serviceable than conventional pneumatic tires of all known types, such as known or conventional tube-tires, inner tube tires and tubeless tires.

Another object of the invention is to provide a tire that is easier to install than known or conventional tires.

Another object of the invention is to provide a tire that generates less heat and wears longer than known or conventional tires.

Another object of the invention is to provide a tire that, for a given weight and degree of pressurization, provides a smoother cushioning action than known or conventional tires. Tires constructed according to the invention have greater "give" which makes them more effective in absorbing shocks and in increasing tread area during starting or stopping, all with less heating or fatigue during operation than conventional tires.

These and other objects and advantages of the invention will appear more clearly upon an understanding of the following disclosure, by way of example, of an embodiment of the invention.

Figure 1:
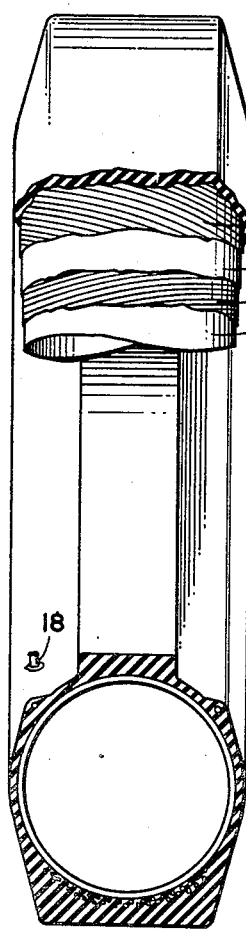
Figure 1 is a fragmentary, partially broken-away view of a tire made according to the invention, the body of the tire being partially broken away.
Figure 2:
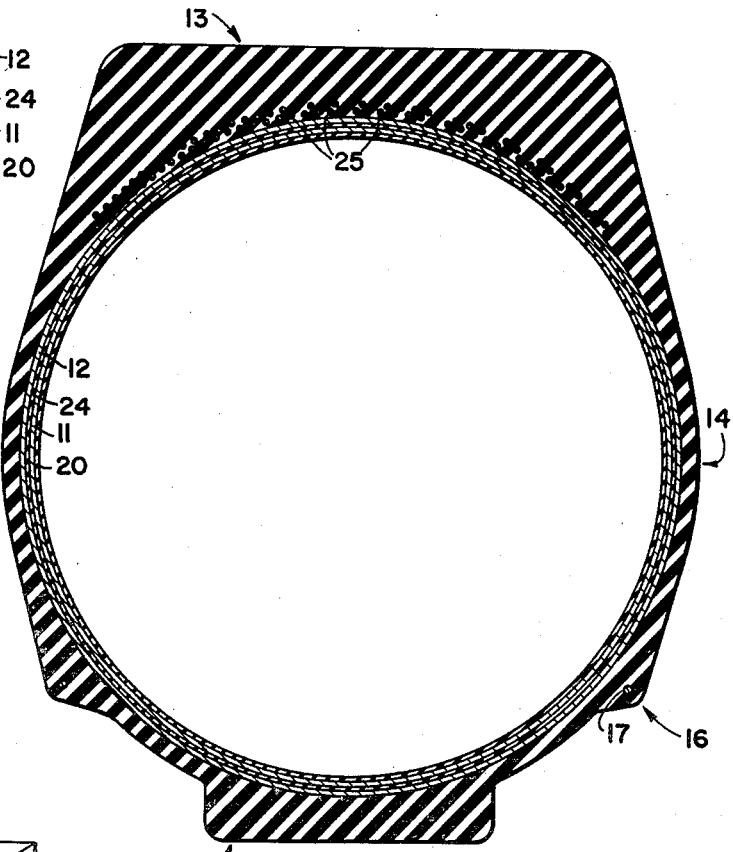
Figure 2 is an enlarged view taken on line 2—2 in Figure 1.

The tire comprises a body 10 having, as illustrated, the shape of a rather massive torus, a typical generating section of this torus being the cross-sectional area shown in Figure 2. The body 10 is made of one or more suitable elastomeric materials which will be well known to those in this art. Embedded in this body and helically wound around it are at least two cords 11 and 12. The cords 11 and 12 are wound in opposite senses and together constitute a web extending on a bias annularly around the body 10. Each cord, when helically wound or wrapped around the entire annular extent of the body 10, may be tied to itself. This will not usually be necessary, however, because the cord's ends will be adequately anchored simply because the cords are embedded in the body. Each cord of a given sense may make several annular laps, if desired. This would be very similar to wrapping, in each sense, several adjacent cords around one annular lap, which may also be done. Prior to inclusion in the tire body, the one or several cords may be coated or covered with elastomeric material to form coated cords or ribbons, at least two of which are provided wrapped in opposite senses in the tire body. The cords may comprise rayon or nylon or any of the suitable tire fabric materials known to the art.

The tire body may comprise a shoe portion 13, sidewall portions 14 and a base or guide portion 15. Bead-like portions 16 may be provided in which may be embedded annularly extending reinforcing wire or cord 17 adapted to engage a clincher rim on a wheel in a manner similar to the clinching engagement of conventional beaded inner tube tires and tubeless tires. An air valve 18 is provided extending through the tire wall.

Figure 3:
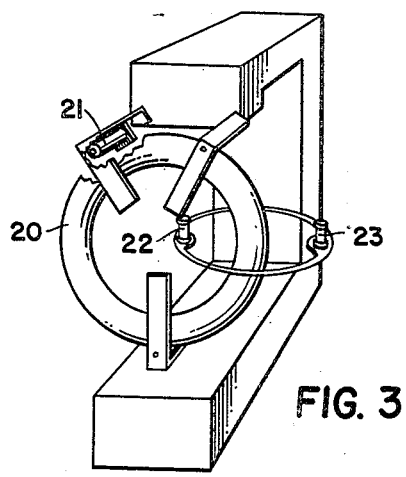
Figure 3 is a schematic illustration of one stage in the manufacture of the invention.

The illustrated tire may be manufactured at unusually low cost. An inner portion 20 may be initially provided which is similar in shape and size to a conventional inner tube. Thus, the inner portion may be referred to as having the shape of an anchor ring, a typical generating section of the anchor ring being seen as the radially innermost cross-sectional zone shown in Figure 2. This may be rendered temporarily rigid at its desired shape by any suitable method, several of which will be apparent to those skilled in the art. For example, it may be filled with a fluid coolant such as liquid carbon dioxide to be temporarily frozen to shape, the pressure of the boiling coolant being relieved through the opening in which it was injected. Or it may be inflated with cold air and immersed in a liquid coolant to be frozen thereby. While the tube 20 is frozen or otherwise stiffened, but preferably after external coolant, if any, has boiled off, the tube is wrapped with the cords 11 and 12 in the manner schematically illustrated in Figure 3. The tube is supported for rotation around its central axis by the rolls 21, one of which may be powered and adapted to drive in either direction. Cord or ribbon on the bobbins 22 and/or 23 is wound around the tube as the tube is rotated in a first sense, thereby producing the helical wrap of the cords 11. The direction of rotation of the tube is then reversed, thus producing the helical wrap 12. The fed-on cord may be severed between wrapping and the inner and outer helical wrappings started at different places, if desired. Between the inner and outer helical wrapping operations, additional sheet material for spacing the cords may be laid on. If this is done, dismounting of the tube from the wrapping station and subsequent rerigidification may be necessary. If the cord is heavily coated, it may not be desirable to add such additional sheet material between the two layers of helically wrapped cord. In any event, however, it will be highly desirable to have in the final product a thin zone or thickness 24 of elastomeric material between the two layers of helically wrapped cord.

Following wrapping of the helical layers of cord, the caps, sides and guides are laid up on the wrapped tube 18, and the resulting assembly is placed in a sectional die press having the desired cavity conformation and is inflated with steam or other fluid to force the assembly against the hot die to form the unitary final product. Of course, if additional elements, such as the reinforcing wires or cords 17 or additional peripheral cords 25, are provided, they are wrapped or laid on and covered prior to the final vulcanizing operation.

We are aware that pneumatic tube-tires have been in use for many years. However, tube-tires constructed according to the invention are superior both to this very old type of tire and to the inner-tube tires and tubeless tires now in widespread use. The present tire has the greatest strength for a given weight, promising a further reduction in unsprung weight on automotive vehicles. It has lower potential cost, both in manufacture and use, than do conventional tires of either the inner tube type or the tubeless type.

In the following claims, it will be understood that the term "cord" is not employed in its strictest sense but includes multiple-cord wrappings, ribbons and other similar variants.

What is claimed is:

1. The method of manufacturing a pneumatic tire comprising the steps of rigidifying a hollow body of elastomeric material in the shape of an anchor ring, helically winding at least one cord around the generating sections of said anchor ring in a first sense throughout the annular extent of said anchor ring, helically winding at least one other cord around the generating sections of said anchor ring in the sense opposite to said first sense throughout the annular extent of said anchor ring, laying on additional tire body material on said anchor ring and over said cords to form a body torus, the generating sections of which contain said cords and contain said initially-mentioned anchor ring, and subjecting the resulting assembly to heat treatment within a forming die to produce a unitary tire body.

2. In the manufacture of pneumatic tires, the steps comprising providing a hollow body in the shape of an anchor ring which is rigid but is subject to becoming permanently flexible, helically winding at least one cord around the generating sections of said anchor ring in a first sense throughout the annular extent of said anchor ring, and helically winding at least one other cord around the generating sections of the said anchor ring in the sense opposite to said first sense throughout the annular extent of said anchor ring, laying on additional tire body material on said anchor ring and over said cords to form a body torus, the generating sections of which contain said cords and contain said initially-mentioned anchor ring, and subjecting the resulting assembly to heat treatment within a forming die to produce a unitary tire body.

3. A pneumatic tire comprising an integral hollow torus of elastomeric material, at least two plies of cord embedded in said material, a first of said plies consisting substantially in its entirety of one or more first cords embedded in said material and helically wound around and within generating sections of said torus and extending annularly around said torus, a second of said plies consisting substantially in its entirety of one or more second cords embedded in said material and helically wound in the opposite sense to said one or more first cords around and within generating sections of said torus and extending annularly around said torus.

4. A pneumatic tire comprising a heavy air envelope of elastomeric material in the shape of a hollow torus, at least two plies of cord embedded in said material, a first of said plies consisting substantially in its entirety of one or more first cords embedded in said material and helically wound around and within generating sections of said torus and extending annularly around said torus, a second of said plies consisting substantially in its entirety of one or more second cords embedded in said material and helically wound in the opposite sense to said one or more first cords around and within generating sections of said torus and extending annularly around said torus, and valve means communicating from the exterior to the interior of said air envelope.

References Cited in the file of this patent

UNITED STATES PATENTS

| | | |
|---|---|---|
| 489,714 | Palmer | Jan. 10, 1893 |
| 910,370 | Gleason | Jan. 19, 1909 |
| 1,024,915 | Subers | Apr. 30, 1912 |
| 1,198,790 | Tew | Sept. 19, 1916 |
| 1,452,168 | Rector | Apr. 17, 1923 |